(12) United States Patent
Blake et al.

(10) Patent No.: US 6,535,579 B1
(45) Date of Patent: Mar. 18, 2003

(54) NETWORK INTERFACE DEVICE WITH DISCONNECTABLE HALF-RINGER

(75) Inventors: K. Erin Blake, Watauga, TX (US); Anthony R. Board, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 119 days.

(21) Appl. No.: 09/584,314

(22) Filed: May 31, 2000

(51) Int. Cl.[7] .......................... H04M 1/24; H04M 3/08; H04M 3/22

(52) U.S. Cl. ................ 379/22.06; 379/1.01; 379/26.01; 379/27.06; 379/29.01; 379/29.05

(58) Field of Search ........................ 379/1.01, 2, 9.06, 379/22, 22.03, 22.06, 27.07, 26.01, 27.01, 29.01, 29.11, 32.01, 32.04, 399, 412; 439/97, 509, 535, 676, 188, 49, 54, 912

(56) References Cited

U.S. PATENT DOCUMENTS

| | | | | |
|---|---|---|---|---|
| 3,814,870 A | * | 6/1974 | Miller | 379/16 |
| 4,647,725 A | * | 3/1987 | Dellinger et al. | 329/29 |
| 4,796,289 A | * | 1/1989 | Masor | 379/26 |
| 5,291,553 A | * | 3/1994 | Smith | 379/399 |
| 5,297,199 A | * | 3/1994 | Graham et al. | 379/399 |
| 5,600,716 A | * | 2/1997 | Broome et al. | 379/399 |
| 5,625,686 A | * | 4/1997 | Capper et al. | 379/399 |
| 5,802,170 A | * | 9/1998 | Smith et al. | 379/412 |
| 5,888,085 A | * | 3/1999 | Meyerhoefer et al. | 439/188 |
| 6,039,578 A | * | 3/2000 | Suffi et al. | 439/54 |
| 6,201,853 B1 | * | 3/2001 | Butler et al. | 379/21 |
| 6,215,856 B1 | * | 4/2001 | Aponte et al. | 379/29 |
| 6,252,941 B1 | * | 6/2001 | Daoud | 379/19 |

* cited by examiner

Primary Examiner—Binh Tieu
(74) Attorney, Agent, or Firm—Christopher C. Dremann

(57) ABSTRACT

A telephone network interface device (NID) includes a test circuit that is readily connected and disconnected. The NID has a portion of an electrical circuit that connects a pair of provider wires as well as a pair of test wires to a pair of subscriber terminals. The test wires lead to a test circuit on the provider side of the housing of the NID. The subscriber terminals are located on the subscriber side of the housing to interconnect the provider wires with a pair of subscriber wires. A jack in the NID has a normal mode of operation in which the provider wires are electrically connected to the subscriber wires and a test mode of operation in which the provider wires are disconnected from the subscriber wires. A pair of lead wires are electrically connected to the jack and have free ends that connect to the subscriber terminals. This connects the test circuit in parallel physically and electrically between the provider wires and the subscriber wires. The free ends are readily disconnected from the subscriber terminals to disconnect the test circuit.

20 Claims, 2 Drawing Sheets

NETWORK INTERFACE DEVICE WITH DISCONNECTABLE HALF-RINGER

TECHNICAL FIELD

This invention relates in general to telephone network interface devices and in particular to such a device having a half-ringer test circuit that can be readily disconnected.

DESCRIPTION OF PRIOR ART

A network interface device ("NID") may be utilized for buildings that have a number of communications lines. The NID provides a demarcation point between the provider lines and the subscriber lines. The NID also allows the subscriber lines to be readily disconnected from the provider lines for test purposes. Typically, for each separate line there will be a jack having a receptacle for an RJ-11 plug. The provider lines are electrically connected to two contacts of the jack. The plug is located on the end of a flexible lead that connects to the subscriber terminals. Inserting the plug into the receptacle places the subscriber terminals in continuity with the provider wires. Removing the plug isolates the subscriber terminals from the provider line for test purposes.

Additionally, some providers prefer to have a half-ringer test circuit included in the NID for testing purposes. In the past, the half-ringer test circuit has been electrically wired in parallel, but physically wired in series between the provider wires and the subscriber terminals within the NID. In particular, the half-ringer test circuit has typically been physically wired in series between the provider lines and two of the contacts of the RJ-11 jack.

The half-ringer test circuit is principally used for testing voice telephone communication lines. It is not compatible with high-speed digital data transmission over telephone lines. Accordingly, if a subscriber is converting a conventional telephone line to a higher speed data line, such as a "DSL" line, the half-ringer must first be disconnected. This presents a problem if the subscriber line is one of many other lines within a building, all leading to the same NID. Removing a half-ringer involved opening the provider side of the NID, cutting four wires and splicing the two provider wires to the two subscriber wires. Subsequently, if that data line was being converted back to a conventional telephone line having a half-ringer, the only way to add the half-ringer back would be to open the provider side of the NID again, cut the two provider wires and reconnect the two provider lines and the two subscriber lines to the half ringer so that the half-ringer is once again physically wired in series between the two provider lines and the subscriber terminals. This practice is not craft-friendly and presents maintenance difficulties.

It is to be understood that both the foregoing general description and the following detailed description are exemplary and explanatory and are intended to provide further explanation of the invention as claimed. The accompanying drawings are included to provide a further understanding of the invention and are incorporated in and constitute a part of this specification, illustrate one or several embodiments of the invention, and, together with the description, serve to explain the principles of the invention.

SUMMARY OF THE INVENTION

The NID in this invention has a housing with a conventional jack mounted in the housing for each communications line. The jack has a subscriber receptacle having first and second pairs of contacts. A pair of provider wires are electrically connected to the first pair of contacts in the subscriber receptacle. A pair of subscriber terminals are mounted in the housing and adapted to be connected to a pair of subscriber wires. A subscriber plug mates with the subscriber receptacle and is connected to a flexible lead. The lead has a first pair of wires that connect the first pair of contacts in the subscriber receptacle to the subscriber terminals. The lead has a second pair of wires that selectively connect the second pair of contacts in the subscriber receptacle to the subscriber terminals.

A test circuit is mounted in the housing and connected by a pair of test wires to the second pair of contacts in the subscriber receptacle. Thus, the second pair of wires of the lead connect to the test circuit when the subscriber plug is plugged into the subscriber receptacle. The second pair of wires of the lead have free ends that may be selectively connected to the subscriber terminals to connect the test circuit. Conversely, the free ends may be selectively disconnected from the subscriber terminals to disconnect the test circuit.

DETAILED DESCRIPTION OF THE INVENTION

Figure 1:
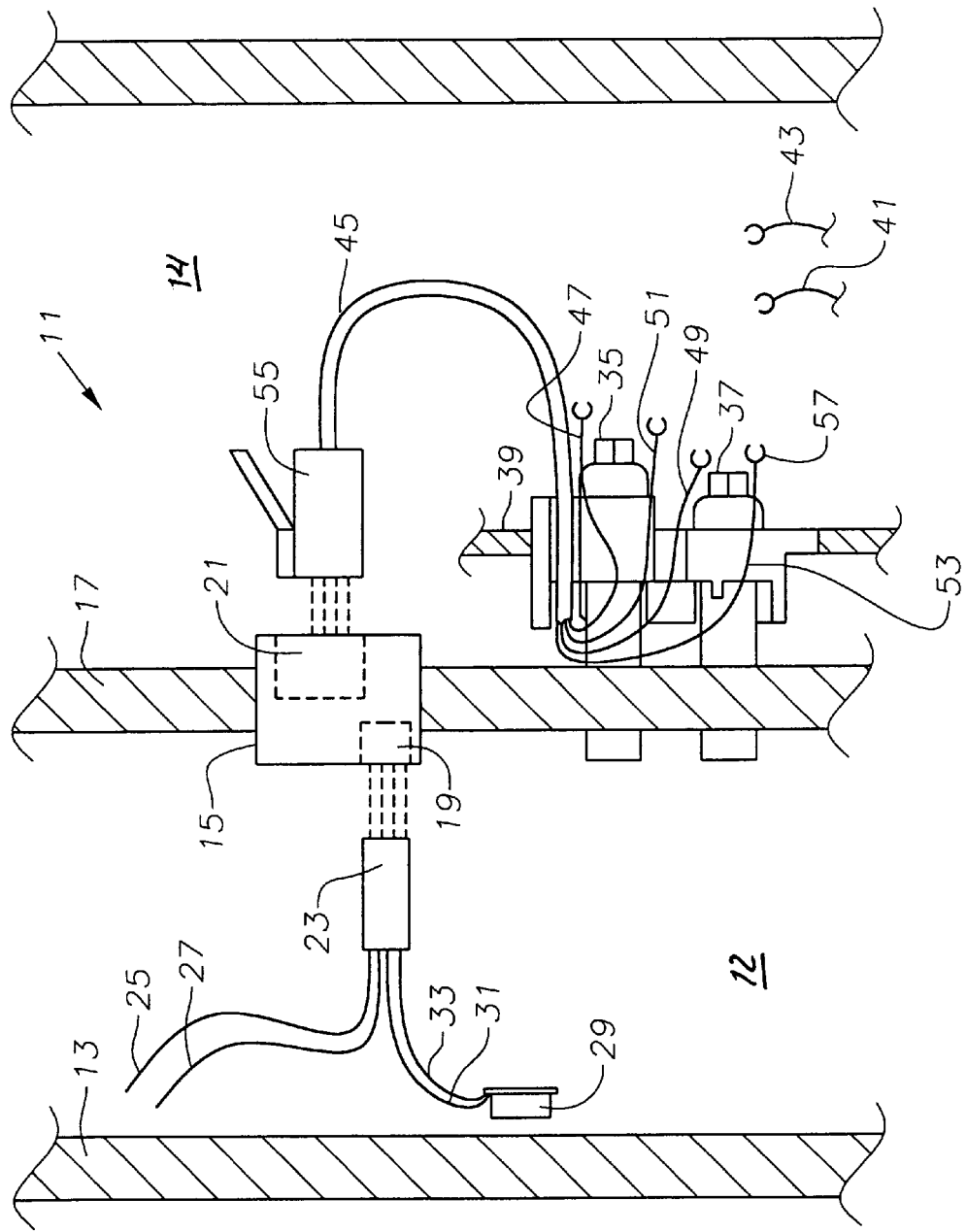
FIG. 1 is a sectional, partially schematic view illustrating an NID constructed in accordance with the present invention.

FIG. 1 illustrates a network interface device (NID) 11 comprising a housing 13. NID 11 may be of a variety of configurations and is only partially shown. NID 11 has a jack 15, which is preferably a conventional RJ-11 connector jack. Jack 15 is shown mounted to a partition 17 within housing 13 that separates a provider side 12 of housing 13 from a subscriber side 14. However, jack 15 may be mounted in an individual line module, in which case partition 17 may or may not be provided. Jack 15 has a provider receptacle 19 on the provider side 12 and a subscriber receptacle 21 on the subscriber side 14. Subscribers (i.e., customers of the telephone company) typically do not have access to the provider side 12 of the housing 13 of NID 11. Jack 15 comprises four contacts 22 (shown schematically in FIG. 2), each of which is located partly in provider receptacle 19 (FIG. 1) and partly in subscriber receptacle 21 (FIG. 1).

A provider plug 23 inserts into provider receptacle 19. Provider plug 23 has two provider wires 25, 27, for example a tip wire and a ring wire, respectively. Provider wires 25, 27 are typically connected to wires in a provider cable (not shown) leading from a telephone company. Once provider plug 23 is inserted into provider receptacle 19, provider wires 25, 27 connect to two of the contacts 22 (FIG. 2) of jack 15.

Figure 2:
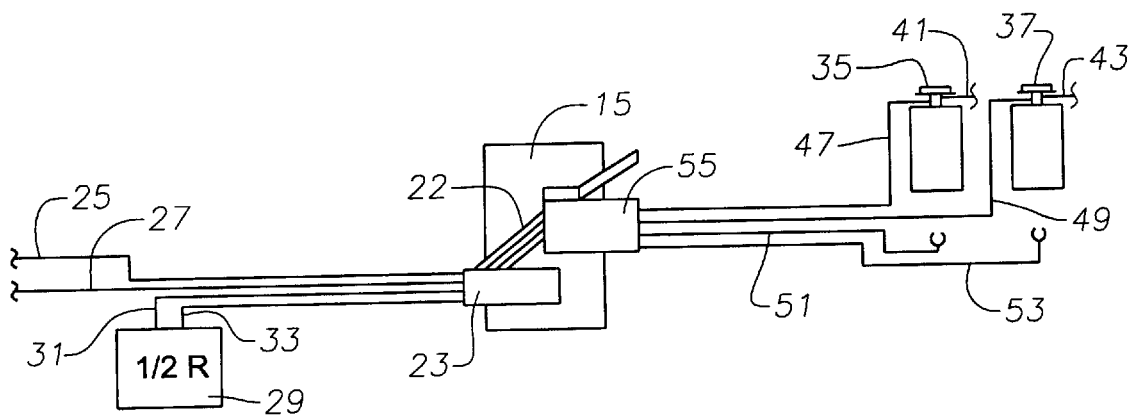
FIG. 2 is an electrical schematic illustrating a portion of an electrical circuit for the NID of FIG. 1.
Figure 3:
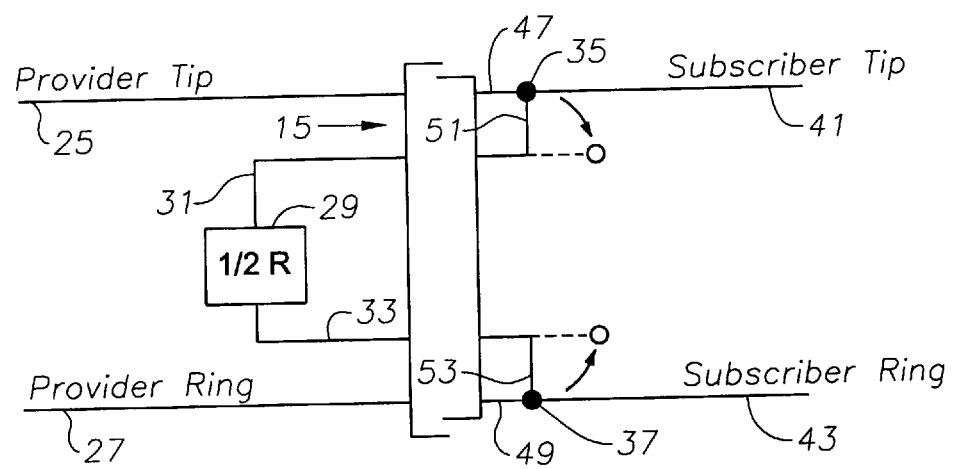
FIG. 3 is a more simplified electrical schematic illustrating the portion of the electrical circuit of FIG. 2.

A test circuit 29 is also mounted in housing 11 and is indicated schematically in FIGS. 2 and 3 by "½ R." Test circuit 29 is a conventional circuit, commonly referred to as a "half-ringer" which is utilized by providers for testing purposes. However, other types of test circuits typically provided in NID 11, such as an MTU may be mounted in housing 11 in place of the half-ringer circuit. Test circuit 29 has two test wires 31, 33 leading to provider plug 23.

Provider plug 23 is thus connected to four wires; two from test circuit 29 and two from the provider cable (i.e., provider wires 25, 27). Once provider plug 23 is inserted into provider receptacle 19, wires 31, 33 connect to the remaining two contacts 22 of jack 15. Provider plug 23 is normally not removed once it has been inserted into provider receptacle 19.

A pair of subscriber terminals 35, 37 are located on the subscriber side 14 of housing 13 of NID 11. Subscriber terminals 35, 37 are shown mounted to a platform 39 of housing 13, but may also be mounted directly to partition 17. Furthermore, although only one is shown, typically there will be a number of jacks 15 and subscriber terminals 35, 37 provided within housing 13 of NID 11. In particular, typically there will be a jack 15 and a pair of subscriber terminals 35, 37 for each telephone line. In an alternative embodiment, jack 15 and subscriber terminals 35, 37 may be contained in a pre-fabricated module that plugs into housing 13 of NID 11.

Subscriber tip and ring wires 41, 43 lead from the subscriber equipment (i.e., telephone) to subscriber terminals 35, 37, respectively. In the preferred embodiment shown, subscriber terminals 35, 37 are of a screw type with a screw head that is rotated to allow subscriber wires 41, 43 to be connected to the subscriber terminals 35, 37. However, other known types of subscriber terminals may be employed, such as insulation displacement connector (IDC) bridges. A flexible lead 45 has two pairs of wires 47, 49 and 51, 53. Wires 47, 49, 51, 53 are preferably partially enclosed within a single sheath of lead 45. Wires 47, 49, 51, 53 have connectors, such as adapters 57 shown in FIG. 1, on their free ends for connection to subscriber terminals 35, 37. A subscriber plug 55 is provided on the opposite end of lead 45 from adapters 57. Subscriber plug 55 mates with subscriber receptacle 21 in jack 15, thereby connecting each wire 47, 49, 51, 53 to one of the contacts 22. Once subscriber plug 55 is inserted, as shown in FIG. 2, provider wires 25, 27 will connect to lead wires 47, 49, respectively. Similarly, test wires 31, 33 will connect to lead wires 51, 53, respectively. The free ends of lead wires 47, 49 and subscriber wires 41, 43 will normally remain connected to subscriber terminals 35, 37.

If test circuit 29 is to be utilized, adapters 57 of lead wires 51, 53 will be secured to terminals 35, 37, respectively. Lead wire 51 will be in electrical common with lead wire 47 and subscriber wire 41 once lead wire 51 is connected to subscriber terminal 35. Similarly, subscriber terminal 37 will place lead wire 53 in electrical common with lead wire 49 and subscriber wire 43 once lead wire 53 is connected to subscriber terminal 37. When inserted into subscriber receptacle 21, subscriber plug 55 will place test circuit 29 physically and electrically in parallel with provider wires 25, 27, as illustrated in FIG. 3. Test wire 31 will be electrically connected to subscriber tip wire 41 and provider tip wire 25. Test wire 33 will be electrically connected to subscriber ring wire 43 and provider ring wire 27. This will be the normal mode of operation for conventional telephone usage.

Removing subscriber plug 55 from subscriber receptacle 21 will disconnect subscriber wires 41, 43 from provider wires 25, 27, and at the same time also disconnect wires 31, 33 of test circuit 29. This test mode of operation allows a technician to insert a telephone receiver with an RJ-11 plug into subscriber receptacle 21 of jack 15 to test whether the provider wires 25, 27 are valid to the jack 15.

If test circuit 29 is not needed, the technician simply disconnects adapters 57 of lead wires 51, 53 from subscriber terminals 35, 37. However, any known type of "switching device" may be utilized in place of adapters 57 for disconnecting lead wires 51, 53 from subscriber terminals 35, 37. Thus, it is not necessary to have access to the provider equipment on the provider side 12 of partition 17 to disconnect test circuit 29. The dotted lines in FIG. 3 illustrate how removal of flexible lead wires 51, 53 disconnects test circuit 29. Later, if it is desired to reconnect test circuit 29, the technician simply reconnects adapters 57 of lead wires 51, 53 to subscriber terminals 35, 37. Accordingly, no splicing of the wires is necessary.

The invention has significant advantages. The test circuit 29 may be connected and disconnected without cutting the provider wires 25, 27 or splicing additional wires to the provider wires 25, 27. The test circuit 29 may be connected and disconnected without needing access to the provider side 12 of the housing 13 of NID 11. Conventional RJ-11 plugs and jacks already have access for two additional wires that are normally not utilized. Therefore, routing the test wires 31, 33 to the provider plug 23 and the lead wires 51, 53 to the subscriber plug 55 for connection through the jack 15 does not require special components.

While the invention has been shown in only one of its forms, it should be apparent to those skilled in the art that it is not so limited, but is susceptible to various changes without departing from the scope of the invention.

That which is claimed is:

1. A network interface device for connecting a pair of provider wires to a pair of subscriber wires, the network interface device comprising:

a housing defining a provider side of the housing and a subscriber side of the housing;

a pair of subscriber terminals mounted on the subscriber side of the housing for electrically connecting the pair of provider wires to the pair of subscriber wires; and a test circuit comprising a pair of test wires connected to the pair of subscriber terminals such that the test circuit is physically and electrically wired in parallel between the pair of provider wires and the pair of subscriber wires;

wherein the test wires are adapted to be removed from the subscriber terminals to disconnect the test circuit without interrupting the electrical connection between the provider wires and the subscriber wires.

2. The network interface device of claim 1 wherein the pair of test wires of the test circuit are disconnected from the pair of subscriber terminals to disconnect the test circuit.

3. The network interface device of claim 1 wherein the portion of the electrical circuit further comprises a jack between the test circuit and the subscriber terminals, the jack comprising a first pair of contacts electrically connected to the pair of provider wires and a second pair of contacts electrically connected to the pair of test wires of the test circuit.

4. The network interface device of claim 3 wherein the jack further comprises:

a provider receptacle for receiving the pair of provider wires and the pair of test wires of the test circuit; and a subscriber receptacle for receiving a lead having a first pair of lead wires connected to the pair of subscriber terminals and a second pair of lead wires for selective connection to the pair of subscriber terminals; and wherein the first pair of contacts of the jack electrically connect the pair of provider wires to the first pair of lead wires and the second pair of contacts of the jack electrically connect the pair of test wires of the test circuit to the second pair of lead wires.

5. The network interface device of claim 4 wherein the portion of the electrical circuit further comprises:
   a provider plug electrically connected to the pair of provider wires and to the pair of test wires of the test circuit for insertion into the provider receptacle; and
   a subscriber plug electrically connected to the first pair of lead wires and to the second pair of lead wires for insertion into the subscriber receptacle.

6. The network interface device of claim 5 wherein each of the first pair of lead wires and each of the second pair of lead wires has a first end partially enclosed within the lead and a second end extending from the lead and terminating in an adapter for connection to one of the pair of subscriber terminals and wherein the adapters of the second ends of the second pair of lead wires are disconnected from the pair of subscriber terminals to disconnect the test circuit.

7. The network interface device of claim 1 wherein the pair of provider wires comprise a provider tip wire and a provider ring wire and the pair of subscriber wires comprise a subscriber tip wire and a subscriber ring wire.

8. The network interface device of claim 7 wherein the pair of subscriber terminals comprise a tip terminal and a ring terminal and wherein the provider tip wire, the subscriber tip wire and one of the pair of test wires of the test circuit is connected to the tip terminal and wherein the provider ring wire, the subscriber ring wire and the other of the pair of test wires of the test circuit is connected to the ring terminal.

9. The network interface device of claim 1 wherein the test circuit comprises a half-ringer circuit.

10. A test assembly for testing an electrical line, the test assembly comprising:
    a pair of conductive subscriber terminals;
    a pair of conductive provider wires electrically connected to the pair of subscriber terminals;
    a pair of conductive subscriber wires electrically connected to the pair of subscriber terminals; and
    a test circuit comprising a pair of test wires electrically connected to the pair of subscriber terminals, the test circuit physically and electrically wired in parallel between the pair of provider wires and the pair of subscriber wires at the pair of subscriber terminals such that the test circuit is disconnectable from the pair of subscriber terminals without cutting and splicing the pair of provider wires or the pair of subscriber wires.

11. The test assembly of claim 10 further comprising a jack electrically connected between the test circuit and the pair of subscriber terminals, the jack comprising a first pair of contacts electrically connected to the pair of provider wires and a second pair of contacts electrically connected to the pair of test wires.

12. The test assembly of claim 11 wherein the jack further comprises:
    a provider receptacle for receiving the pair of provider wires and the pair of test wires; and
    a subscriber receptacle for receiving a first pair of lead wires connected to the pair of subscriber terminals and a second pair of lead wires for selective connection to the pair of subscriber terminals;
    wherein the first pair of contacts electrically connect the pair of provider wires to the first pair of lead wires and the second pair of contacts electrically connect the pair of test wires to the second pair of lead wires.

13. The test assembly of claim 12 further comprising:
    a provider plug for selective insertion into the provider receptacle, the provider plug electrically connected to the pair of provider wires and to the pair of test wires; and
    a subscriber plug for selective insertion into the subscriber receptacle, the subscriber plug electrically connected to the first pair of lead wires and to the second pair of lead wires.

14. The test assembly of claim 13 wherein each of the first pair of lead wires and each of the second pair of lead wires has a first end for connection to the subscriber plug and a second end for connection to one of the pair of subscriber terminals and wherein the second ends of the second pair of lead wires are disconnected from the pair of subscriber terminals to disconnect the test circuit.

15. The test assembly of claim 10 wherein the pair of provider wires comprise a provider tip wire and a provider ring wire and the pair of subscriber wires comprise a subscriber tip wire and a subscriber ring wire.

16. The test assembly of claim 15 wherein the pair of subscriber terminals comprise a tip terminal and a ring terminal and wherein the provider tip wire, the subscriber tip wire and one of the pair of test wires is connected to the tip terminal and wherein the provider ring wire, the subscriber ring wire and the other of the pair of test wires is connected to the ring terminal.

17. The test assembly of claim 10 wherein the test circuit comprises a half-ringer circuit.

18. A test assembly for testing a telephone line between a telephone company central office and a subscriber premises, the test assembly comprising:
    a housing defining a provider portion and a subscriber portion;
    a pair of subscriber terminals located within the subscriber portion of the housing;
    a pair of provider wires that enter the housing within the provider portion and are electrically connected to the pair of subscriber terminals;
    a pair of subscriber wires that enter the housing within the subscriber portion and are electrically connected to the pair of subscriber terminals;
    a test circuit located within the provider portion of the housing, the test circuit comprising a pair of test wires that are electrically connected to the pair of subscriber terminals, the test circuit physically and electrically wired in parallel between the pair of provider wires and the pair of subscriber wires at the pair of subscriber terminals such that the test circuit is disconnectable from the pair of subscriber terminals without cutting and splicing the pair of provider wires or the pair of subscriber wires.

19. The test assembly of claim 18 further comprising a jack positioned within an opening provided through the partition and electrically connected between the test circuit and the pair of subscriber terminals, the jack comprising
    a provider receptacle for receiving the pair of provider wires and the pair of test wires; and a subscriber receptacle for receiving a first pair of lead wires connected to the pair of subscriber terminals and a second pair of lead wires for selective connection to the pair of subscriber terminals;

a first pair of contacts electrically connected between the pair of provider wires and the first pair of lead wires and a second pair of contacts electrically connected between the pair of test wires and the second pair of lead wires;

a provider plug for selective insertion into the provider receptacle, the provider plug electrically connected to the pair of provider wires and to the pair of test wires; and a subscriber plug for selective insertion into the subscriber receptacle, the subscriber plug electrically connected to the first pair of lead wires and to the second pair of lead wires.

20. The test assembly of claim 19 wherein each of the first pair of lead wires and each of the second pair of lead wires has a first end for connection to the subscriber plug and a second end for connection to one of the pair of subscriber terminals and wherein the second ends of the second pair of lead wires are disconnected from the pair of subscriber terminals to disconnect the test circuit.

* * * * *